(12) United States Patent
Kojima

(10) Patent No.: US 9,400,030 B2
(45) Date of Patent: Jul. 26, 2016

(54) VIBRATION-DAMPING DEVICE

(71) Applicant: BRIDGESTONE CORPORATION, Chuo-ku, Tokyo (JP)

(72) Inventor: Hiroshi Kojima, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/409,738

(22) PCT Filed: Jun. 13, 2013

(86) PCT No.: PCT/JP2013/066341
§ 371 (c)(1),
(2) Date: Dec. 19, 2014

(87) PCT Pub. No.: WO2014/002781
PCT Pub. Date: Jan. 3, 2014

(65) Prior Publication Data
US 2015/0337919 A1    Nov. 26, 2015

(30) Foreign Application Priority Data

Jun. 25, 2012   (JP) ................................. 2012-141931

(51) Int. Cl.
*F16F 5/00*        (2006.01)
*F16F 13/10*       (2006.01)
(Continued)

(52) U.S. Cl.
CPC ............. *F16F 13/106* (2013.01); *B60K 5/1208* (2013.01); *F16F 13/08* (2013.01)

(58) Field of Classification Search
CPC ......... F16F 13/08; F16F 13/10; F16F 13/102; F16F 13/105; F16F 13/106; F16F 15/08; B60K 5/1208
USPC ............... 267/140.13, 140.11, 140.12, 141.2; 248/636, 638
See application file for complete search history.

(56) References Cited

U.S. PATENT DOCUMENTS

| 4,903,951 A | 2/1990 | Miyamoto et al. |
| 2003/0047856 A1 | 3/2003 | Muramatsu et al. |

(Continued)

FOREIGN PATENT DOCUMENTS

| CN | 1683806 A | 10/2005 |
| DE | 31 40 783 A1 | 4/1983 |

(Continued)

OTHER PUBLICATIONS

International Search Report of PCT/JP2013/066341 dated Jul. 9, 2013.

(Continued)

*Primary Examiner* — Pamela Rodriguez
(74) *Attorney, Agent, or Firm* — Sughrue Mion, PLLC

(57) ABSTRACT

A vibration-damping device (10) includes a first attachment member (11) having a cylindrical shape connected to any one of a vibration generating unit and a vibration receiving unit, a second attachment member (12) connected to the other unit, an elastic body (13) configured to connect both of the attachment members, and a partition member (15) configured to divide a liquid chamber (16) in the first attachment member (11) into a main liquid chamber (17) having a wall surface formed partly from the elastic body (13), and a subsidiary liquid chamber (18). In the partition member (15), an accommodating chamber (47) in communication with the main liquid chamber (17) and the subsidiary liquid chamber (18) through communication holes (46A, 46B) opened in an axial direction, an elastically deformable membrane (48) accommodated in the accommodating chamber (47) and separately exposed to the main liquid chamber (17) and the subsidiary liquid chamber (18) through the communication holes (46A, 46B), and restriction sections (51A, 51B) disposed more outside in the axial direction than the communication holes (46A, 46B) and overlapping the membrane (48) through the communication holes (46A, 46B) in the axial direction are installed. According to the vibration-damping device (10), performance of the membrane (48) can be maintained for a long period of time.

4 Claims, 3 Drawing Sheets

(51) Int. Cl.
*F16F 13/08* (2006.01)
*B60K 5/12* (2006.01)

(56) References Cited

U.S. PATENT DOCUMENTS

| | | | |
|---|---|---|---|
| 2005/0230889 A1 | 10/2005 | Minamisawa | |
| 2006/0097435 A1* | 5/2006 | Yoneyama | F16F 13/105 267/140.11 |
| 2011/0042870 A1* | 2/2011 | Kojima | F16F 13/10 267/140.11 |
| 2012/0074629 A1* | 3/2012 | Yamamoto | F16F 13/106 267/140.13 |

FOREIGN PATENT DOCUMENTS

| | | | |
|---|---|---|---|
| EP | 0346060 | A2 | 12/1989 |
| JP | 64-049731 | A | 2/1989 |
| JP | 2006-097824 | A | 4/2006 |
| JP | 2006-112608 | A | 4/2006 |
| JP | 2007-218420 | A | 8/2007 |
| JP | 2010-007837 | A | 1/2010 |
| WO | 2008156169 | A1 | 12/2008 |
| WO | 2009/133925 | A1 | 11/2009 |
| WO | 2011/099357 | A1 | 8/2011 |

OTHER PUBLICATIONS

Communication dated Oct. 10, 2015 from the Intellectual Property Office of the P.R. China issued in counterpart Chinese application No. 201380033043.3.

* cited by examiner

FIG. 3     50A, 50B
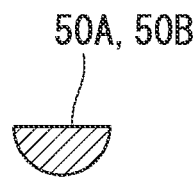
FIG. 4     46A, 46B     51A, 51B
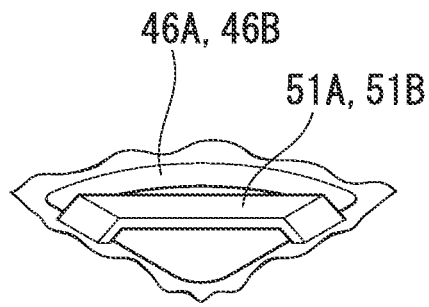

VIBRATION-DAMPING DEVICE

TECHNICAL FIELD

The present invention relates to a vibration-damping device.

Priority is claimed on Japanese Patent Application No. 2012-141931, filed Jun. 25, 2012, the content of which is incorporated herein by reference.

BACKGROUND ART

In the related art, for example, a vibration-damping device disclosed in Patent Literature 1 is known. The vibration-damping device includes a first attachment member having a cylindrical shape connected to any one of a vibration generating unit and a vibration receiving unit, a second attachment member connected to the other unit, an elastic body configured to connect both of the attachment members, and a partition member configured to divide a liquid chamber in the first attachment member in which liquid is sealed in an axial direction into a main liquid chamber having a wall surface formed partly from the elastic body and a subsidiary liquid chamber. An accommodating chamber in communication with the main liquid chamber and the subsidiary liquid chamber through communication holes opened in an axial direction, and an elastically deformable membrane accommodated in the accommodating chamber and separately exposed to the main liquid chamber and the subsidiary liquid chamber through the communication holes are installed at the partition member.

In the vibration-damping device, when vibrations having large amplitudes are input in the axial direction, as the membrane is displaced or elastically deformed in the axial direction in the accommodating chamber, the membrane abuts the inner surface of the accommodating chamber to close the communication hole from the inside in the axial direction. Meanwhile, when vibrations having small amplitudes are input in the axial direction, the membrane is displaced or elastically deformed in the axial direction in the accommodating chamber so as not to close the communication hole, and a variation in the liquid pressure in the main liquid chamber is applied to the subsidiary liquid chamber through the communication holes and the accommodating chamber. Accordingly, the large variation in the liquid pressure in the main liquid chamber is suppressed to make the vibration-damping device as a low spring, i.e., suppress an increase in the spring constant of the vibration-damping device, improving ride comfort characteristics.

CITATION LIST

Patent Literature

[Patent Literature 1] Japanese Unexamined Patent Application, First Publication No. 2006-97824

SUMMARY OF INVENTION

Technical Problem

Here, in such a vibration-damping device, for example, reliable reduction in a spring constant is required even when the vibrations having small amplitudes and a high frequency serving as vibrations generated during running of the vehicle are input. In regard to the requirement, it is considered to correspond to an increase in an opening area of the communication hole. However, in this case, when the vibrations having large amplitudes are input in the axial direction, after the membrane abuts the inner surface of the accommodating chamber to close the communication hole from the inside in the axial direction, the membrane may be excessively deformed from the accommodating chamber toward the outside of the accommodating chamber through the communication hole in some cases, and thus, the membrane may be deteriorated prematurely.

In consideration of the above-mentioned circumstances, the present invention is directed to provide a vibration-damping device capable of maintaining performance of a membrane for a long period of time.

Solution to Problem

In order to solve the problems, the present invention provides the following means.

A vibration-damping device according to the present invention includes a first attachment member having a cylindrical shape connected to any one of a vibration generating unit and a vibration receiving unit, and a second attachment member connected to the other unit; an elastic body configured to connect both of the attachment members; and a partition member configured to divide a liquid chamber in the first attachment member, in which liquid is sealed, into a main liquid chamber having a wall surface formed partly from the elastic body, and a subsidiary liquid chamber, wherein, in the partition member, an accommodating chamber in communication with the main liquid chamber and the subsidiary liquid chamber through communication holes opened in an axial direction of the first attachment member, and an elastically deformable membrane accommodated in the accommodating chamber and separately exposed to the main liquid chamber and the subsidiary liquid chamber through the communication holes are installed, and in the partition member, a restriction section disposed more outside in the axial direction than the communication hole and overlapping the membrane in the axial direction through the communication hole is installed.

According to the present invention, since the restriction section is installed at the partition member, when the vibrations having large amplitudes are input in the axial direction and the membrane is deformed from the accommodating chamber toward the outside of the accommodating chamber through the communication hole in the axial direction, further deformation of the membrane can be restricted as the membrane abuts the restriction section. Accordingly, excessive deformation of the membrane can be suppressed, and performance of the membrane can be maintained for a long period of time.

In addition, since the restriction section is disposed more outside in the axial direction than the communication hole, reduction in the opening area of the communication hole due to formation of the restriction section can be suppressed. Accordingly, an increase in a spring constant of the vibration-damping device can be reliably suppressed even when the vibrations having a high frequency are input.

In addition, the plurality of communication holes may be disposed at intervals in a circumferential direction of the first attachment member, the length in a circumferential direction of the communication hole may be gradually increased from the inside toward the outside in a radial direction of the first attachment member, an inter-hole portion disposed between the communication holes neighboring in a circumferential direction of the partition member may extend in the radial direction, and the length in a circumferential direction of the inter-hole portion may be gradually increased from the inside toward the outside in the axial direction.

In this case, since the length in the circumferential direction of the inter-hole portion of the partition member is gradually increased from the inside toward the outside in the axial direction, when the vibrations having large amplitudes are input in the axial direction and the membrane abuts the inner surface of the accommodating chamber, an area in which the membrane comes in contact with the surface of inter-hole portion directed inward in the axial direction can be gently increased. Accordingly, strange noises generated as the membrane abuts the partition member can be suppressed.

In addition, in this way, in the case in which the length in the circumferential direction of the inter-hole portion of the partition member is gradually increased from the inside toward the outside in the axial direction, when the vibrations having large amplitudes are input in the axial direction, the membrane is likely to be excessively deformed from the accommodating chamber toward the outside of the accommodating chamber through the communication hole in the axial direction. Accordingly, an effect is remarkably achieved in which excessive deformation of the membrane can be remarkably suppressed by the restriction section.

In addition, a surface of the inter-hole portion directed inward in the axial direction may be formed in an arc shape convexed inward in the axial direction when seen in a cross-sectional view in both of the axial direction and the circumferential direction.

In this case, since the surface of the inter-hole portion of the partition member directed inward in the axial direction is formed in the arc shape convexed inward in the axial direction when seen in the cross-sectional view, the area in which the membrane comes in contact with the surface of the inter-hole portion directed inward in the axial direction can be more gently increased.

Advantageous Effects of Invention

According to the vibration-damping device of the present invention, performance of the membrane can be maintained for a long period of time.

BRIEF DESCRIPTION OF DRAWINGS

FIG. 3 is a cross-sectional view of an inter-hole portion of a partition member that constitutes a vibration-damping device according to a variant of the present invention; and FIG. 4 is a perspective view of major parts of the partition member that constitutes the vibration-damping device according to the variant of the present invention.

DESCRIPTION OF EMBODIMENT

Hereinafter, a vibration-damping device according to an embodiment of the present invention will be described based on the accompanying drawings.

Figure 1:
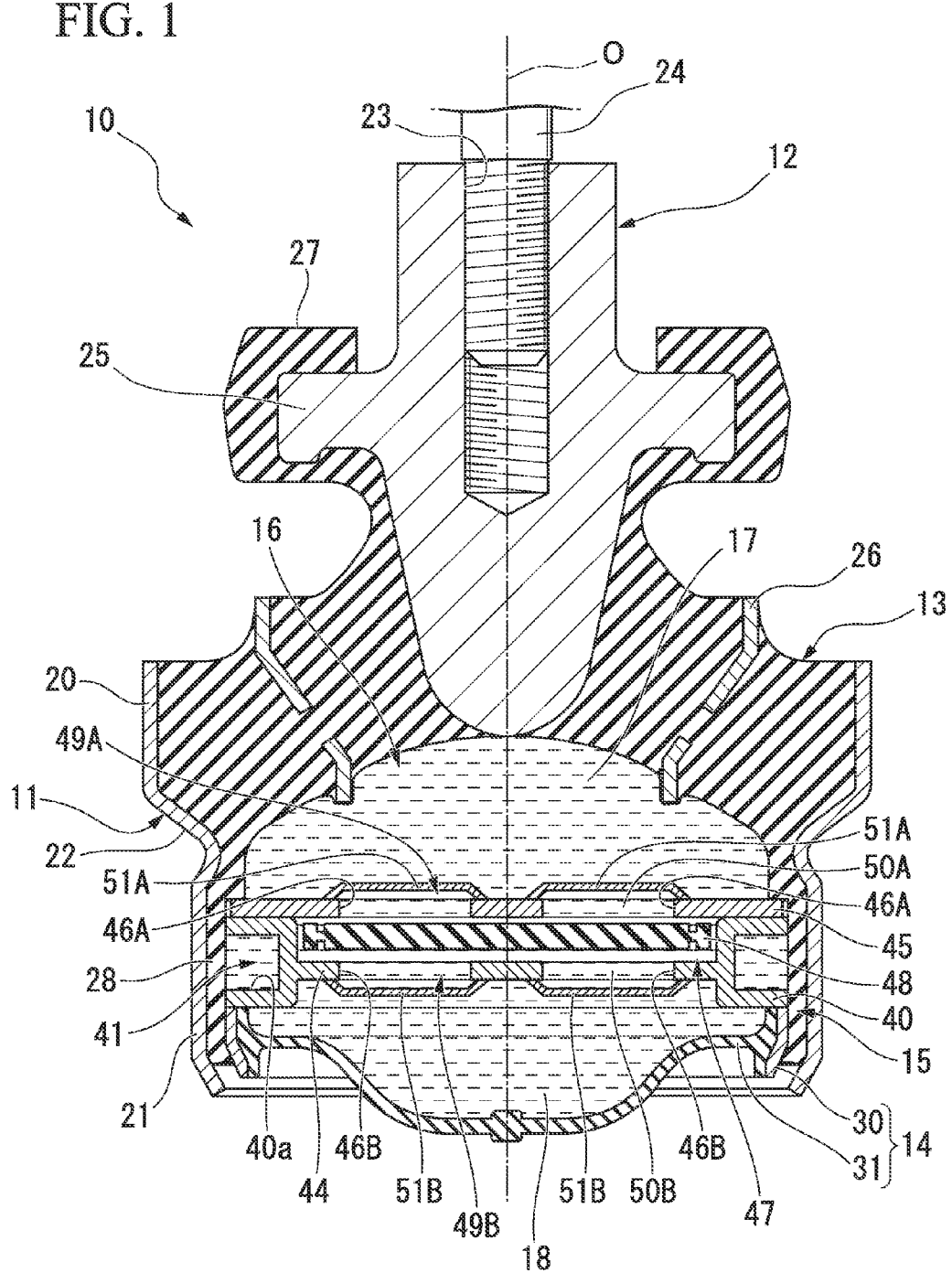
FIG. 1 is a longitudinal cross-sectional view of a vibration-damping device according to an embodiment of the present invention.

As shown in FIG. 1, a vibration-damping device 10 is an engine mount configured to support an engine serving as a vibration generating unit in an automobile with respect to a vehicle body serving as a vibration receiving section. The vibration-damping device 10 includes a first attachment member 11 having a cylindrical shape and connected to any one of the vibration generating unit and the vibration receiving unit, a second attachment member 12 connected to the other unit, and an elastic body 13 configured to elastically connect the first attachment member 11 and the second attachment member 12.

Here, central axes of the first attachment member 11, the second attachment member 12 and the elastic body 13 are disposed on a common axis. Hereinafter, the common axis is referred to as an axis O, a direction along the axis O is referred to as an axial direction, a subsidiary liquid chamber 18 side is referred to as the other side, a direction perpendicular to the axis O is referred to as a radial direction, and a direction orbiting the axis O is referred to as a circumferential direction. In addition, a lower side of FIG. 1 is a bound side, i.e., a direction in which a static load (an initial load) is input when the vibration-damping device 10 is installed, and an upper side of FIG. 1 is a rebound side, i.e., an opposite side of the input direction of the static load. In the following description, the bound side is referred to as "downward" and the rebound side is referred to as "upward."

A large diameter section 20 having a cylindrical shape is formed at an upper end section of the first attachment member 11. A small diameter section 21 having a cylindrical shape with a diameter smaller than that of the large diameter section 20 is formed at a lower end section of the first attachment member 11. A recessed section 22 having a diameter reduced toward an inner circumferential side is formed between the large diameter section 20 and the small diameter section 21. The small diameter section 21 is fitted into a cylindrical section of a vehicle body-side bracket (not shown). The first attachment member 11 is fixed to a vehicle body via the vehicle body-side bracket.

The second attachment member 12 is a columnar member extending in the axial direction. The second attachment member 12 is disposed inside in the radial direction of the first attachment member 11. The second attachment member 12 is disposed over the first attachment member 11 substantially concentrically with the first attachment member 11. A lower section of the second attachment member 12 is formed in a tapered shape having a diameter gradually reduced in a downward direction. A screw hole 23 extending from a center of an upper end surface of the second attachment member 12 in the axial direction is formed at an upper section of the second attachment member 12. A bolt 24 of an engine-side bracket (not shown) is twisted and fitted into the screw hole 23. The second attachment member 12 is fixed to an engine via the engine-side bracket. An anchor section 25 protruding outward in the radial direction is formed at an intermediate portion in the axial direction of the second attachment member 12.

The elastic body 13 is a rubber body configured to close an opening section of an upper side of the first attachment member 11. An outer circumferential surface of the elastic body 13 is vulcanized and adhered to the large diameter section 20 of the first attachment member 11 and the inner circumferential surface of the recessed section 22, and the inner circumferential surface of the elastic body 13 is vulcanized and adhered to the outer circumferential surface of the lower section of the second attachment member 12. An inner ring 26 disposed between the first attachment member 11 and the second attachment member 12 is buried in the elastic body 13. In the upper end section of the elastic body 13, a rubber coating body 27 configured to cover the anchor section 25 is integrally formed with the elastic body 13, and a rebound stopper is formed by the rubber coating body 27 and the anchor section 25. In the lower end section of the elastic body 13, a rubber membrane 28 configured to coat the inner circumferential surface of the small diameter section 21 is integrally formed with the elastic body 13. Further, an elastic body formed of a synthetic resin or the like, other than rubber, may also be used as the elastic body 13.

An opening section of a lower side of the first attachment member 11 is closed by a diaphragm 14. The diaphragm 14 is a lid body fitted into the small diameter section 21 of the first attachment member 11. The diaphragm 14 includes a diaphragm ring 30 having a substantially cylindrical shape, and a diaphragm rubber 31 having a membranous shape and configured to close the inside of the diaphragm ring 30. The diaphragm rubber 31 is a rubber membrane having a bowl shape. An outer circumferential section of the diaphragm rubber 31 is vulcanized and adhered to an inner circumferential surface of the diaphragm ring 30. The diaphragm 14 is fixed to the first attachment member 11 by caulking the lower end section of the diaphragm ring 30 to the inside in the radial direction along with the lower end section of the small diameter section 21 in a state in which the diaphragm 14 is fitted into the small diameter section 21 of the first attachment member 11. Further, the rubber membrane 28 is interposed between the outer circumferential surface of the diaphragm ring 30 and the inner circumferential surface of the small diameter section 21 of the first attachment member 11. Accordingly, water tightness of a place at which the diaphragm 14 and the first attachment member 11 are fitted is secured.

A liquid chamber 16 in which a liquid such as ethylene glycol, water, or the like, is sealed is formed inside the first attachment member 11. The liquid chamber 16 is closed by the elastic body 13 and the diaphragm 14. The liquid chamber 16 is divided into a main liquid chamber 17 of an upper side and the subsidiary liquid chamber 18 of a lower side in the axial direction by a partition member 15 disposed inside the first attachment member 11. The main liquid chamber 17 is a liquid chamber formed using the elastic body 13 as a part of a partition wall. The inner capacity of the main liquid chamber 17 is varied by deformation of the elastic body 13. The subsidiary liquid chamber 18 is a liquid chamber using the diaphragm 14 as a part of a partition wall. An inner capacity of the subsidiary liquid chamber 18 is varied by deformation of the diaphragm rubber 31 of the diaphragm 14.

Figure 2:
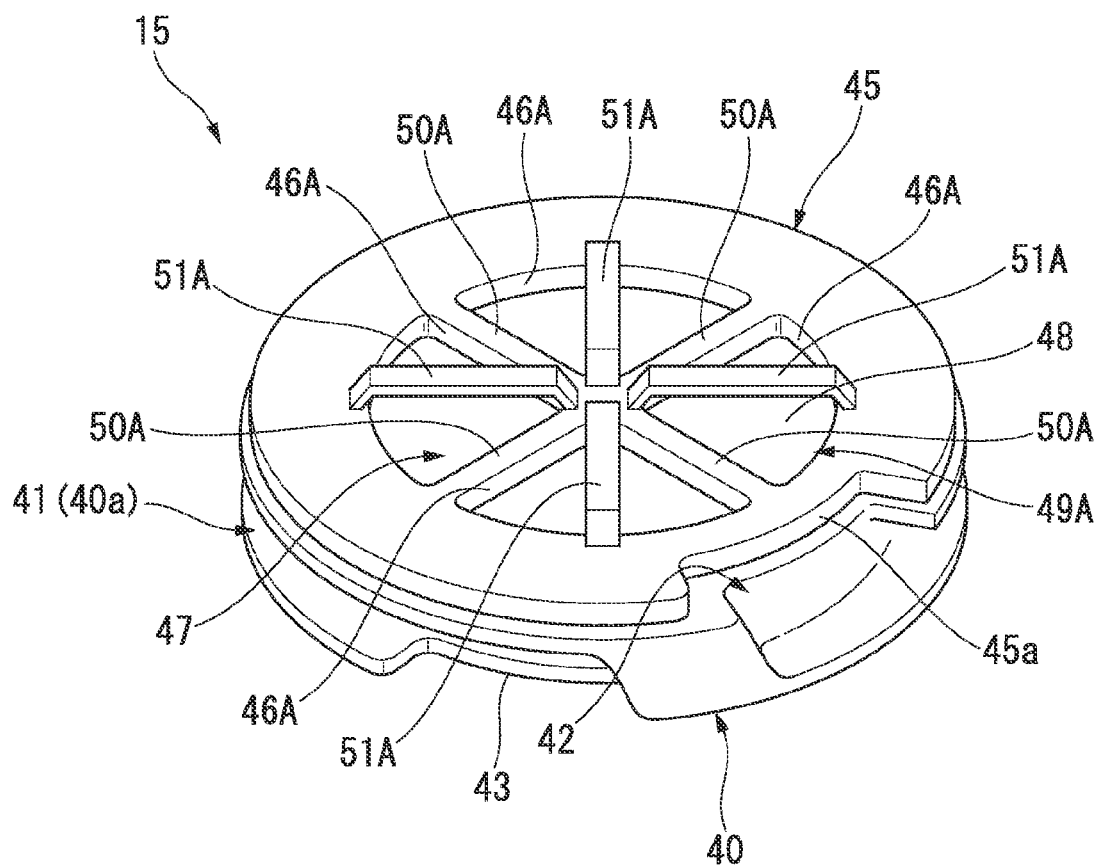
FIG. 2 is a perspective view of a partition member that constitutes the vibration-damping device shown in FIG. 1.

As shown in FIG. 2, the partition member 15 includes a main body member 40 having a bottomed cylindrical shape, and a plate-shaped lid member 45 attached to the upper surface of the main body member 40 and covering an upper opening of the main body member 40.

The main body member 40 is fitted into the small diameter section 21 of the first attachment member 11. The main body member 40 is a circular member when seen in a plan view, and formed of, for example, a metal, a resin, or the like. A bottom plate section 44 of the main body member 40 is installed at an intermediate section in the axial direction of the main body member 40. The bottom plate section 44 is disposed perpendicular to the axis O. A restriction passage 41 in communication with the main liquid chamber 17 and the subsidiary liquid chamber 18 is formed at the outer circumferential surface of the main body member 40. The restriction passage 41 is a liquid flow path extending in the circumferential direction of the first attachment member 11. A circumferential groove 40a is formed in the outer circumferential surface of the main body member 40, and the restriction passage 41 is formed by the circumferential groove 40a. A portion opened outside in the radial direction of the circumferential groove 40a is closed by the rubber membrane 28.

As shown in FIG. 2, an opening section 42 near the main liquid chamber in communication with the restriction passage 41 and the main liquid chamber 17 is formed at a first end section in a flow path length direction, which is a direction along the length of the restriction passage 41. The opening section 42 is a port opened toward the main liquid chamber 17 and through which liquid flows to enter and exit. The opening section 42 is formed at the upper surface of the main body member 40. The opening section 42 is formed by cutting a portion of the first end section in the flow path length direction of the restriction passage 41 in the upper surface of the main body member 40, and extends in an arc shape in the circumferential direction.

An opening section 43 near the subsidiary liquid chamber in communication with the restriction passage 41 and the subsidiary liquid chamber 18 is formed at a second end section in the flow path length direction of the restriction passage 41. The opening section 43 is a port opened toward the subsidiary liquid chamber 18 and through which the liquid flows to enter and exit. The opening section 43 is formed at a lower surface of the main body member 40. The opening section 43 is formed by cutting a portion of the second end section in the flow path length direction of the restriction passage 41 in the lower surface of the main body member 40, and extends in an arc shape in the circumferential direction.

The lid member 45 is a flat plate-shaped member having a circular shape when seen in a plan view. An outer diameter of the lid member 45 is substantially equal to an outer diameter of the main body member 40. A cutout opening 45a in communication with the opening section 42 near the main liquid chamber is formed at the lid member 45. The opening 45a extends throughout the entire length in the circumferential direction of the opening section 42, and is a cutout in an arc shape when seen in a plan view. The opening section 42 is opened at the main liquid chamber 17 via the inside of the opening 45a.

As shown in FIG. 1, in the embodiment, an accommodating chamber 47 and an elastically deformable membrane 48 are installed at the partition member 15.

The accommodating chamber 47 is disposed between the bottom plate section 44 of the main body member 40 and the lid member 45. An inner surface of the accommodating chamber 47 is constituted by surfaces of the bottom plate section 44 and the lid member 45 facing inward in the axial direction. The accommodating chamber 47 comes in communication with the main liquid chamber 17 and the subsidiary liquid chamber 18 through communication holes 46A and communication holes 46B opened in the axial direction, respectively. The membrane 48 is accommodated in the accommodating chamber 47 and separately exposed to the main liquid chamber 17 and the subsidiary liquid chamber 18 through the communication holes 46A and 46B, respectively.

The communication holes 46A and 46B are formed in the end surfaces directed outward in the axial direction in the partition member 15. The communication holes 46A and 46B are disposed at a portion disposed more inside in the radial direction than the membrane 48. A first communication hole 46A in communication with the accommodating chamber 47 and the main liquid chamber 17 and a second communication hole 46B in communication with the accommodating chamber 47 and the subsidiary liquid chamber 18 are provided in the communication holes 46A and 46B. As shown in FIGS. 1 and 2, the plurality of first communication holes 46A and the plurality of second communication holes 46B are disposed at intervals in the circumferential direction. Lengths in the circumferential direction of the first communication hole 46A and the second communication hole 46B are gradually increased from the inside toward the outside in the radial direction. A first hole array 49A having an annular shape in which the first communication holes 46A are disposed at intervals in the circumferential direction and a second hole array 49B having an annular shape in which the second communication holes 46B are disposed at intervals in the circumferential direction have substantially the same shape and substantially the same size.

The four first communication holes 46A are formed in the lid member 45 at intervals in the circumferential direction. The first communication holes 46A have substantially the same shape and substantially the same size. In a plan view of the partition member 15 when seen in a plan view in the axial direction, the first communication hole 46A has a fan shape in which a central angle is 90 degrees. In the plan view, the plurality of first communication holes 46A are disposed in point-symmetry with respect to the axis O. In the partition member 15, a first inter-hole portion 50A disposed between the first communication holes 46A neighboring in the circumferential direction extends in the radial direction. The plurality of first inter-hole portions 50A are disposed at equal intervals in the circumferential direction. The first inter-hole portions 50A have substantially the same shape and substantially the same size. The first inter-hole portion 50A connects a central section disposed more inside in the radial direction than the first hole array 49A and an outer circumferential section disposed more outside in the radial direction than the first hole array 49A in the lid member 45.

The four second communication holes 46B shown in FIG. 1 are formed in the bottom plate section 44 of the main body member 40 at equal intervals in the circumferential direction. The second communication holes 46B have substantially the same shape and substantially the same size. In the plan view, the second communication hole 46B has a fan shape in which a central angle is 90 degrees. In the plan view, the plurality of second communication holes 46B are disposed in point symmetry with respect to the axis O. In the partition member 15, a second inter-hole portion 50B disposed between the second communication holes 46B neighboring in the circumferential direction extends in the radial direction. The second inter-hole portions 50B are disposed at equal intervals in the circumferential direction. The second inter-hole portions 50B have substantially the same shape and substantially the same size. The second inter-hole portion 50B connects a central section disposed more inside in the radial direction than the second hole array 49B and an outer circumferential section disposed more outside in the radial direction than the second hole array 49B in the bottom plate section 44 of the main body member 40.

The membrane 48 is a disk-shaped member having a diameter larger than that of the first hole array 49A and the second hole array 49B. The membrane 48 is constituted by, for example, an elastic member such as rubber or the like, and can be vertically vibrated in the accommodating chamber 47. The membrane 48 is a movable plate displaced in the axial direction according to a pressure difference between the main liquid chamber 17 and the subsidiary liquid chamber 18. The membrane 48 abuts the inner surface of the accommodating chamber 47 to close all of the plurality of first communication holes 46A or all of the plurality of second communication holes 46B when subsequent shake vibrations serving as the vibration having a resonance frequency of restriction passage 41 are input. Further, the membrane 48 may be a so-called fixed membrane. In this case, in the fixed membrane, the outer circumferential section is fixed into the accommodating chamber 47, and the central section more inside than the outer circumferential section can be elastically deformed in the axial direction.

Restriction sections 51A and restriction sections 51B are installed at the partition member 15. The restriction sections 51A and 51B are disposed more outside in the axial direction than the communication holes 46A and 46B, and overlap the membrane 48 in the axial direction through the communication holes 46A and 46B. The plurality of restriction sections 51A and 51B are installed to correspond to all of the communication holes 46A and 46B. The restriction sections 51A and 51B include a first restriction section 51A disposed more outside in the axial direction than the first communication hole 46A and a second restriction section 51B disposed more outside in the axial direction than the second communication hole 46B.

The first restriction section 51A straddles over the first communication hole 46A in the radial direction. Both of the end sections in the radial direction of the first restriction section 51A are separately connected to the lid member 45. As shown in FIG. 2, in the plan view, the first restriction sections 51A radially cross the central section of the first communication hole 46A in the circumferential direction. The first restriction sections 51A and the first inter-hole portions 50A of the partition member 15 are alternately disposed in the circumferential direction. A surface of the first restriction section 51A directed inward in the axial direction has an area larger than that of the first inter-hole portion 50A directed inward in the axial direction.

As shown in FIG. 1, the second restriction section 51B straddles under the second communication hole 46B in the radial direction. Both of the end sections in the radial direction of the second restriction section 51B are separately connected to the bottom plate section 44 of the main body member 40. In the plan view, the second restriction sections 51B radially cross the central section of the second communication hole 46B in the circumferential direction. The second restriction sections 51B and the second inter-hole portions 50B of the partition member 15 are alternately disposed in the circumferential direction. A surface of the second restriction section 51B directed inward in the axial direction has an area larger than that of the second inter-hole portion 50B directed inward in the axial direction.

In the vibration-damping device 10, the second attachment member 12 is connected to the engine (not shown) via the engine-side bracket (not shown), and the first attachment member 11 is connected to the vehicle body (not shown) via the vehicle body-side bracket (not shown). Accordingly, the vibration-damping device 10 is interposed between the engine and the vehicle body.

When the engine is operated, the vibrations of the engine are transmitted to the second attachment member 12 of the vibration-damping device 10 via the engine-side bracket. Accordingly, the vibrations having a relatively low frequency, i.e., shake vibrations having larger amplitudes and smaller frequency (for example, 8 Hz to 15 Hz) than in the idle operation, are input in the vibration-damping device 10. Here, as the elastic deformity and displacement of the membrane 48 in the accommodating chamber 47 in the axial direction is synchronized with a variation in the liquid pressure in the main liquid chamber 17 according to the input of the vibrations, the membrane 48 abuts the inner surface of the accommodating chamber 47 to close the communication holes 46A and 46B. For this reason, the liquid pressure of the main liquid chamber 17 is varied according to repeated motions in the vertical direction of the second attachment member 12 by the shake vibrations (movement in which motions toward the bound side and motions in the rebound direction are alternately repeated). Accordingly, an inner pressure difference between the main liquid chamber 17 and the subsidiary liquid chamber 18 is generated, and the liquid in the liquid chamber 16 reciprocates between the main liquid chamber 17 and the subsidiary liquid chamber 18 through the restriction passage 41. A flow path length and a cross-sectional area of the restriction passage 41 are adjusted to correspond to the shake vibrations, and a resonance phenomenon (a liquid column resonance) is generated in the liquid flowing through the restriction passage 41 to attenuate the shake vibrations. Accordingly, the vibrations transmitted to the vehicle body are reduced.

Here, in the embodiment, after the shake vibrations or the vibrations having even larger amplitudes are input and the membrane 48 closes the communication holes 46A and 46B, when the membrane 48 is deformed from the inside of the accommodating chamber 47 toward the outside of the accommodating chamber 47 through the communication holes 46A and 46B in the axial direction to abut the restriction sections 51A and 51B, further deformation of the membrane 48 is restricted.

Meanwhile, for example, when the number of revolutions of the engine is increased to more than in the idle operation and the automobile travels at a constant speed, the vibrations having a relatively higher frequency, i.e., high frequency vibrations having smaller amplitudes and higher frequency than in the idle operation (for example, 80 Hz to 100 Hz) are input into the vibration-damping device 10. Then, while anti-resonance is generated in the restriction passage 41 to restrict circulation of the liquid, the membrane 48 is displaced or elastically deformed in the accommodating chamber 47 in the axial direction. Accordingly, the liquid pressure of the main liquid chamber 17 is applied to the subsidiary liquid chamber 18 through the communication holes 46A and 46B and the accommodating chamber 47. As a result, a large variation in the liquid pressure in the main liquid chamber 17 is suppressed, and an increase in the spring constant of the vibration-damping device 10 is suppressed.

As described above, according to the vibration-damping device 10 of the present embodiment, since the restriction sections 51A and 51B are installed at the partition member 15, when the membrane 48 is deformed toward the outside of the accommodating chamber 47 from the inside of the accommodating chamber 47 through the communication holes 46A and 46B in the axial direction, further deformation of the membrane 48 is restricted as the membrane 48 abuts the restriction sections 51A and 51B. Accordingly, excessive deformation of the membrane 48 can be suppressed, and performance of the membrane 48 can be maintained for a long period of time.

In addition, since the restriction sections 51A and 51B are disposed more outside in the axial direction than the communication holes 46A and 46B, reduction in the opening area of the communication holes 46A and 46B due to formation of the restriction sections 51A and 51B can be suppressed, and an increase in the spring constant of the vibration-damping device 10 can be reliably suppressed even when the high frequency vibrations are input.

In addition, since the surface of the first restriction section 51A directed inward in the axial direction has an area larger than that of the first inter-hole portion 50A directed inward in the axial direction, a contact area between the membrane 48 and the first restriction section 51A can be secured, and excessive deformation of the membrane 48 can be securely suppressed.

In addition, since the surface of the second restriction section 51B directed inward in the axial direction has an area larger than that of the second inter-hole portion 50B directed inward in the axial direction, a contact area between the membrane 48 and the second restriction section 51B can be secured, and excessive deformation of the membrane 48 can be securely suppressed.

Further, the technical scope of the present invention is not limited to the embodiment but various modifications may be made without departing from the scope of the present invention.

For example, as shown in FIG. 3, the length in the circumferential direction of each of the inter-hole portions 50A and 50B of the partition member 15 may be gradually increased from the inside toward the outside in the axial direction. Further, in the example shown, the surfaces of the inter-hole portions 50A and 50B directed inward in the axial direction are formed in arc shapes convexed inward in the axial direction when seen in a cross-sectional view in both of the axial direction and the circumferential direction.

In this case, since the length in the circumferential direction of each of the inter-hole portions 50A and 50B of the partition member 15 is gradually increased from the inside toward the outside in the axial direction, when the vibrations having large amplitudes are input in the axial direction and the membrane 48 abuts the inner surface of the accommodating chamber 47, an area in which the membrane 48 comes in contact with the surfaces of the inter-hole portions 50A and 50B directed inward in the axial direction can be gently increased. Accordingly, strange noises generated as the membrane 48 abuts the partition member 15 can be suppressed.

Further, in this case, since the surfaces of the inter-hole portions 50A and 50B of the partition member 15 directed inward in the axial direction are formed in arc shapes convexed inward in the axial direction, an area in which the membrane 48 comes in contact with the surfaces of the inter-hole portions 50A and 50B directed inward in the axial direction can be more gently increased.

In addition, as described above, in the case in which the lengths in the circumferential direction of the inter-hole portions 50A and 50B of the partition member 15 are gradually increased from the inside toward the outside in the axial direction, when the vibrations having large amplitudes are input in the axial direction, the membrane 48 is likely to be easily deformed from the inside of the accommodating chamber 47 toward the outside of the accommodating chamber 47 through the communication holes 46A and 46B in the axial direction. Accordingly, an effect is remarkably achieved in which excessive deformation of the membrane 48 can be remarkably suppressed by the restriction sections 51A and 51B.

In addition, in the embodiment, while both of the end sections in the radial direction of the restriction sections 51A and 51B are separately connected to the partition member 15, the present invention is not limited thereto. For example, only one end section in the radial direction of the restriction section may be connected to the partition member, and the other end section may not be connected to the partition member.

Further, in the embodiment, while the restriction sections 51A and 51B extend in the radial direction, the present invention is not limited thereto. For example, as shown in FIG. 4, the restriction sections 51A and 51B may extend in the circumferential direction.

In addition, in the embodiment, while the first restriction section 51A and the second restriction section 51B are provided as the restriction sections 51A and 51B, the present invention is not limited thereto. For example, as the restriction section, only the first restriction section may be provided or only the second restriction section may be provided. Further, even in the case in which only the second restriction section is provided, when the vibrations are input and the liquid pressure of the main liquid chamber is increased, excessive deformation of the membrane can be effectively suppressed. Further, the restriction passage 41 may not be provided.

In addition, the communication holes 46A and 46B are not limited to the embodiment, and for example, the plurality of communication holes may not be disposed in the circumferential direction.

In addition, the components of the embodiment may be appropriately substituted with known components without departing from the scope of the present invention, and the above-mentioned variant may be appropriately combined therewith.

INDUSTRIAL APPLICABILITY

In the vibration-damping device, performance of the membrane can be maintained for a long period of time.

REFERENCE SIGNS LIST

10 vibration-damping device
11 first attachment member
12 second attachment member
13 elastic body
15 partition member
16 liquid chamber
17 main liquid chamber
18 subsidiary liquid chamber
46A, 46B communication hole
47 accommodating chamber
48 membrane
50A, 50B inter-hole portion
51A, 51B restriction section

The invention claimed is:

1. A vibration-damping device comprising:
    a first attachment member having a cylindrical shape connected to any one of a vibration generating unit and a vibration receiving unit, and a second attachment member connected to the other unit;
    an elastic body configured to connect both of the attachment members; and
    a partition member configured to divide a liquid chamber in the first attachment member, in which liquid is sealed, into a main liquid chamber having a wall surface formed partly from the elastic body, and a subsidiary liquid chamber,
    wherein, in the partition member,
    an accommodating chamber in communication with the main liquid chamber through one or more first communication holes opened in an axial direction of the first attachment member and the subsidiary liquid chamber through one or more second communication holes opened in the axial direction, and
    an elastically deformable membrane accommodated in the accommodating chamber and separately exposed to the main liquid chamber and the subsidiary liquid chamber through the first and the second communication holes is installed,
    in the partition member, a restriction section disposed more outside in the axial direction than the first and the second communication holes and overlapping the membrane in the axial direction through the first and the second communication holes is installed; and
    the first communication holes and the second communication holes are configured to penetrate in the axial direction a portion of the partition member, the portion being located between an inner surface of the accommodating chamber and an end surface of the partition member in the axial direction, and communicate the accommodating chamber with the main liquid chamber and the subsidiary liquid chamber.

2. The vibration-damping device according to claim 1, wherein each of the first and the second communication holes are disposed in plurality at intervals in a circumferential direction of the first attachment member,
    the length in the circumferential direction of the communication holes is gradually increased from the inside toward the outside in a radial direction of the first attachment member,
    an inter-hole portion disposed between the first and second communication holes neighboring in a circumferential direction of the partition member extends in the radial direction, and
    the length in a circumferential direction of the inter-hole portion is gradually increased from the inside toward the outside in the axial direction.

3. The vibration-damping device according to claim 2, wherein a surface of the inter-hole portion directed inward in the axial direction is formed in an arc shape convexed inward in the axial direction when seen in a cross-sectional view in both of the axial direction and the circumferential direction.

4. The vibration-damping device according to claim 1, wherein each of the first and the second communication holes are disposed in plurality at intervals in a circumferential direction of the first attachment member,
    in the partition member, inter-hole portions are disposed between the first communication holes neighboring in the circumferential direction and between the second communication holes neighboring in the circumferential direction, and
    the restriction section is disposed more outside in the axial direction than the inter-hole portions.

\* \* \* \* \*